US012689829B2

(12) United States Patent
Xu et al.

(10) Patent No.: US 12,689,829 B2
(45) Date of Patent: Jul. 21, 2026

(54) CAMERA DEVICE WITH ANTI-SHAKE IMAGE SENSOR, AND ELECTRONIC DEVICE

(71) Applicant: Changzhou AAC Raytech Optronics Co., Ltd., Changzhou City (CN)

(72) Inventors: Tongming Xu, Changzhou (CN); Suohe Wei, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 70 days.

(21) Appl. No.: 18/673,323

(22) Filed: May 24, 2024

(65) Prior Publication Data

US 2025/0175699 A1    May 29, 2025

(30) Foreign Application Priority Data

Nov. 27, 2023    (CN) .......................... 202323218707.3

(51) Int. Cl.
| | |
|---|---|
| *H04N 23/68* | (2023.01) |
| *G03B 13/36* | (2021.01) |
| *H02K 41/035* | (2006.01) |
| *H04N 23/54* | (2023.01) |

(52) U.S. Cl.
CPC ........... *H04N 23/687* (2023.01); *G03B 13/36* (2013.01); *H02K 41/0354* (2013.01); *H04N 23/54* (2023.01)

(58) Field of Classification Search
CPC ...... H04N 23/687; H04N 23/54; H04N 23/55; H04N 23/57; G03B 13/36; G03B 3/10; G03B 5/00; G03B 2205/0069; H02K 41/0354
See application file for complete search history.

(56) References Cited

U.S. PATENT DOCUMENTS

| | | | | |
|---|---|---|---|---|
| 2020/0244849 A1* | 7/2020 | Lin | ......................... | H04N 23/67 |
| 2020/0260011 A1* | 8/2020 | Sasaki | ...................... | G03B 5/00 |
| 2024/0048830 A1* | 2/2024 | Bian | .................... | H04N 23/685 |
| 2025/0244637 A1* | 7/2025 | Hou | ......................... | G03B 5/04 |

FOREIGN PATENT DOCUMENTS

| | | | | |
|---|---|---|---|---|
| CN | 117590619 A | * | 2/2024 | ............. G03B 13/36 |

* cited by examiner

*Primary Examiner* — Padma Haliyur
(74) *Attorney, Agent, or Firm* — Wiersch Law Group

(57) ABSTRACT

The present application relates to a camera device and electronic device. The camera device includes a lens module, a focusing drive module and an anti-shake drive module sequentially fixed into a one-piece. The lens module, the focusing drive module, and the anti-shake drive module are three mutually independent modules, so each module is assembled separately and then the three modules are assembled together, which is easier to assemble and can effectively improve the product yield rate. The focusing drive module includes a lens barrel fixed to the lens module, a first bracket accommodating the lens barrel, a focusing coil and a focusing magnetic steel arranged correspondingly, and a first circuit board. The anti-shake drive module includes an image sensor, an anti-shake coil, an anti-shake magnet, and a planar second circuit board in a planar shape to effectively reduce the thickness of the anti-shake drive module and the camera device.

16 Claims, 9 Drawing Sheets

100

100

1

CAMERA DEVICE WITH ANTI-SHAKE IMAGE SENSOR, AND ELECTRONIC DEVICE

CROSS-REFERENCE TO RELATED APPLICATIONS

This application claims the priority of Chinese Patent Application No. 202323218707.3, entitled "CAMERA DEVICE AND ELECTRONIC DEVICE", filed with the China National Intellectual Property Administration on Nov. 27, 2023, which is incorporated herein by reference in its entirety.

TECHNICAL FIELD

The present application relates to the field of camera devices, in particular to a camera device and an electronic device.

BACKGROUND

In the current market, common handheld optical products such as digital cameras, camcorders, and smartphones utilize optical systems composed of optical lens modules combined with imaging drive modules. Besides featuring autofocus functionality, the imaging drive module also incorporates image stabilization due to the susceptibility of handheld optical products to external forces during focusing or photography, such as shaking caused by handheld operation, vehicle movement, or environmental factors, leading to image blurring or lack of clarity. Consequently, the imaging drive module often includes image stabilization features. Given its integration of multiple functions, the structure of the imaging drive module is complex, including numerous components assembled together. As a result, the assembly process of the imaging drive module is intricate, and any slight oversight can easily result in improper assembly of handheld optical products, thereby affecting product yield.

SUMMARY

An object of the present application is to provide a camera device and an electronic device, to solve the technical problems that the camera device is difficult to assemble and the product yield is low in the related art.

The technical solution of the present application is as follows: a camera device, the camera device, comprising:
  a lens module;
  a focusing drive module, comprising:
    a lens barrel fixed to the lens module;
    a first bracket configured to accommodate the lens barrel;
    a focusing coil and a focusing magnetic steel that are arranged correspondingly; and
    a first circuit board, the first circuit board being electrically connected to the focusing coil to enable an interaction between the focusing coil and the focusing magnetic steel to drive the lens barrel to move along a direction of an optical axis of the lens module; and
  an anti-shake drive module, wherein the lens module, the focusing drive module, and the anti-shake drive module are sequentially fixed into a one-piece, and the anti-shake drive module comprises:
    an image sensor;

2 an anti-shake coil and an anti-shake magnetic steel that are arranged correspondingly; and
    a planar second circuit board; wherein the second circuit board is electrically connected to the focusing coil to enable an interaction between the anti-shake coil and anti-shake magnetic steel to drive the image sensor relative to the lens module to move along a direction around the optical axis or along a direction perpendicular to the optical axis.

In some embodiments, the anti-shake drive module further comprises a spring plate, and a first housing configured to accommodate the image sensor, the anti-shake coil, the anti-shake magnetic steel, the second circuit board, and the spring plate; the spring plate comprises a spring plate body and a spring plate fixing portion elastically connected to the spring plate body; the second circuit board comprises a circuit board body and a circuit board fixing portion elastically connected to an outside of the circuit board body, and the circuit board body and the circuit board fixing portion are both elastically connected to the first housing; the circuit board body is provided with a sunken through-hole for cooperating with the image sensor; the image sensor is connected to an inside of the sunken through-hole and abutted against the spring plate body, and the anti-shake coil and anti-shake magnetic steel are fixed to the circuit board body and the first housing, respectively.

In some embodiments, a countersunk surface lower than a surface of the spring plate body is formed on the spring plate body; the countersunk surface is formed by performing a semi-etching treatment on the surface of the spring plate body, and the image sensor is affixed to the countersunk surface of the spring plate body.

In some embodiments, the anti-shake drive module further comprises a second bracket accommodated in the first housing; one end of the second bracket is fixed to the circuit board body along the direction of the optical axis, and a gap is provided between the other end of the second bracket and the first housing; and the second bracket is provided with a first limit groove configured to accommodate the anti-shake coil.

In some embodiments, the first housing is provided with a mounting hole suitable for the image sensor to pass through; the mounting hole is provided with a plurality of bending portions symmetrically formed around a peripheral edge of the mounting hole and bending toward the second bracket; the second bracket is provided with docking grooves correspondingly cooperating with the bending portions, and the docking grooves are filled with a first damping adhesive at least partially wrapping the bending portions.

In some embodiments, an anti-collision tab is formed on a surface of the second bracket facing the first housing.

In some embodiments, the focusing coil is wound outside the lens barrel, and the focusing magnetic steel is fixed in the first bracket; the focusing drive module further comprises two elastic pieces supported at two ends of the lens barrel in the direction of the optical axis; each of the elastic pieces comprising an elastic piece body connected to the lens barrel, a first connecting portion, a second connecting portion, and a third connecting portions that are bending and extending outwardly from the elastic piece body; the first connecting portions of the two elastic pieces are connected to two ends of the first bracket in the direction of the optical axis, respectively; and the second connecting portions and the third connecting portions of the two elastic pieces are connected to the focusing coil and the first circuit board, respectively, to form a circuit.

In some embodiments, the focusing drive module further comprises a second housing configured to accommodate the lens barrel, the first bracket, the focusing coil, the focusing magnetic steel, and the first circuit board; one end of the first bracket along the direction of the optical axis is provided with a second limit groove facing the second housing, and the second limit groove is filled with a second damping adhesive; the lens barrel is provided with a limit portion extending outwardly from the lens barrel, and the limit portions cooperate with the second limit grooves one by one and are limited between the second housing and the corresponding second limit groove; each of the limit portions is provided with a step structure for avoiding the second damping adhesive, and end surfaces of both ends of each of the limit portion along the direction of the optical axis are constructed as anti-collision surfaces.

In some embodiments, the first circuit board is electrically connected to the second circuit board; the focusing drive module further comprises a driver chip and a chip magnetic steel that are cooperated with each other to detect a position of the lens barrel; the driver chip is electrically connected to the first circuit board, and the chip magnetic steel is fixed to the lens barrel and arranged opposite to the driver chip.

An electronic device, comprising a device body and any one of the above-mentioned camera devices, wherein the camera device is provided on the device body.

The beneficial effect of the present application is that: the camera device and electronic device of the present application include a lens module, a focusing drive module and an anti-shake drive module that are sequentially fixed into a one-piece. The focusing drive module includes a lens barrel fixed to the lens module, a first bracket accommodating the lens barrel, a focusing coil and a focusing magnetic steel that are arranged correspondingly, and a first circuit board. The first circuit board is electrically connected to the focusing coil to enable an interaction between the focusing coil and the focusing magnetic steel to drive the lens barrel to move along a direction of an optical axis of the lens module. The anti-shake drive module includes an image sensor, an anti-shake coil and an anti-shake magnetic steel that are arranged correspondingly, and a planar second circuit board. The second circuit board is electrically connected to the image sensor and the anti-shake coil to enable an interaction between the anti-shake coil and anti-shake magnetic steel to drive the image sensor relative to the lens module to move along a direction around an optical axis or along a direction perpendicular to the optical axis. In the above manner, the lens module, the focusing drive module, and the anti-shake drive module are three mutually independent modules, so each module is assembled separately and then the three modules are assembled together during assembly, which is easier to assemble and can effectively improve the product yield rate. Besides, the focusing drive module can drive the lens barrel to move along the direction of the optical axis of the lens module within the first bracket in order to achieve a focusing effect, and the anti-shake drive module can drive the image sensor to move relative to the lens module along the direction of the optical axis or along the direction perpendicular to the optical axis to achieve an anti-shake effect, which can effectively guarantee the camera quality. Moreover, the second circuit board is planar, which can effectively reduce the thickness of the anti-shake drive module and the thickness of the camera device.

DETAILED DESCRIPTION OF THE EMBODIMENTS

Figure 1:
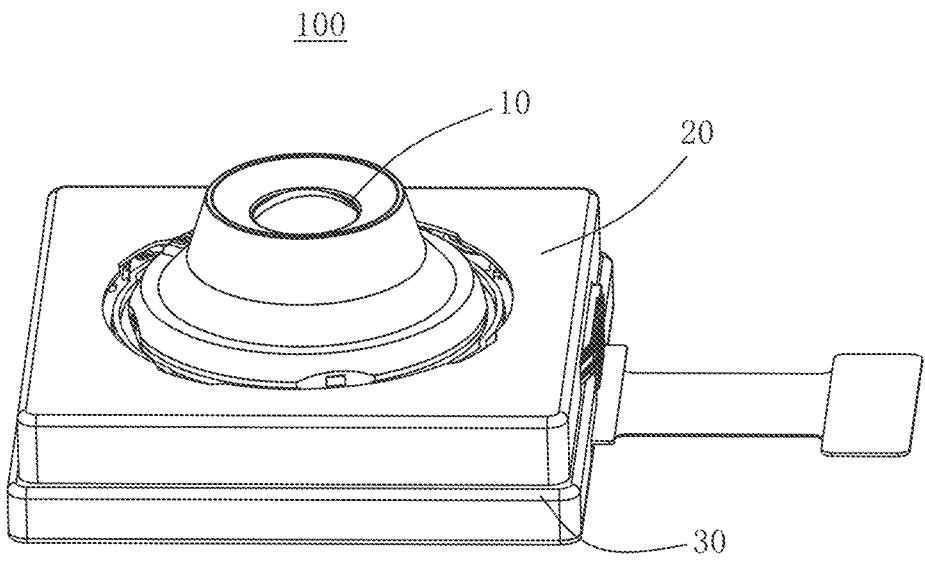
FIG. 1 shows a three-dimensional view of a camera device of the present application.
Figure 2:
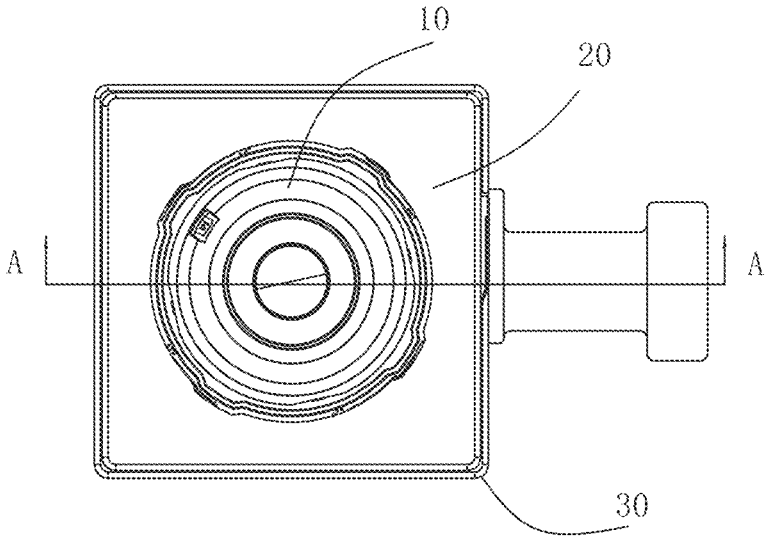
FIG. 2 shows a top view of the camera device of the present application.
Figure 3:
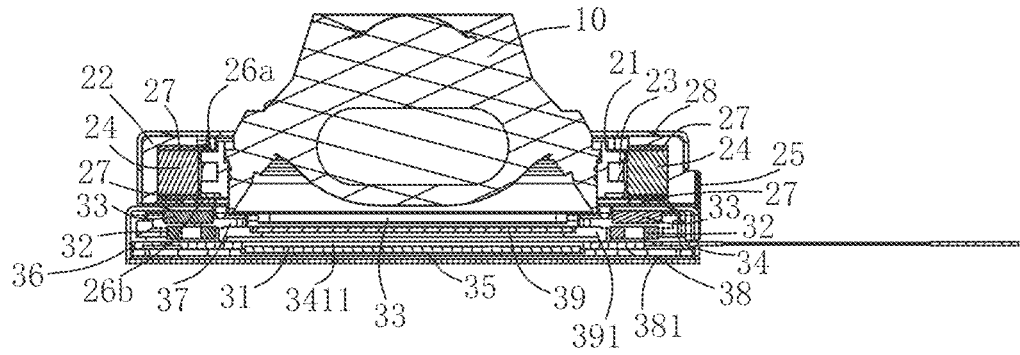
FIG. 3 shows a sectional structural view of the camera device in FIG. 2 along the line A-A.

The present application is further described hereinafter in combination with the accompanying drawings and the embodiments.

It should be noted that the terms "first", "second" and "third" in the specification and claims of the present application and the above-described accompanying drawings are used to distinguish between different objects rather than describe a particular order. The terms "first", "second" and "third" are used to distinguish different objects, not to describe a particular order. In addition, the term "include", and any variations thereof, are intended to cover non-exclusive inclusion. For example, a process, method, system, product, or apparatus including a series of steps or units is not limited to the listed steps or units, but optionally also includes steps or units that are not listed, or optionally includes other steps or units that are inherent to the process, method, product, or apparatus.

All directional indications (such as up, down, left, right, front, back, inside, outside, top, bottom, etc.) in the embodiments of the present application are used only to explain relative positional relationships between components in a particular attitude (as shown in the accompanying drawings), and the directional indications are changed accordingly if that particular attitude is changed. When an element is "fixed to" or "arranged on" another element, the element may be directly disposed on the other element or there may be centered elements. When an element is "connected" to another element, it may be directly connected to the other element or there may be centered elements.

An embodiment of the present application provides a camera device 100 including a lens module 10, a focusing drive module 20, and an anti-shake drive module 30. As shown in FIGS. 1 to 15, the lens module 10, the focusing drive module 20, and the anti-shake drive module 30 are arranged sequentially in a direction of an optical axis and are fixed into a one-piece; the focusing drive module 20 includes a lens barrel 21, a first bracket 22, a focusing coil 23, a focusing magnetic steel 24 and first circuit board 25. The lens barrel 21 is configured to fix the lens module 10. The first bracket 22 is configured to accommodate the lens barrel 21. The focusing coil 23 and focusing magnetic steel 24 are arranged correspondingly. The first circuit board 25 is electrically connected to the focusing coil 23. When focusing coil 23 is energized, a magnetic force is generated between the focusing coil 23 and the focusing magnetic steel 24, so as to drive the lens barrel 21 to move along the optical axis of the lens module 10 within the first bracket 22. The anti-shake drive module 30 includes an image sensor 31, an anti-shake coil 32, an anti-shake magnetic steel 33, and a second circuit board 34. The anti-shake coil 32 and the anti-shake magnetic steel 33 are arranged correspondingly, and the second circuit board 34 is planar. The second circuit board 34 is electrically connected to the anti-shake coil 32, and also electrically connected to the image sensor 31. When the anti-shake coil 32 is energized, a magnetic force is generated between the anti-shake coil 32 and the anti-shake magnetic steel 33, so as to drive the image sensor 31 to move relative to the lens module 10 along the direction around the optical axis, or, drive the image sensor 31 to move relative to the lens module 10 along a direction perpendicular to the optical axis.

Figure 4:
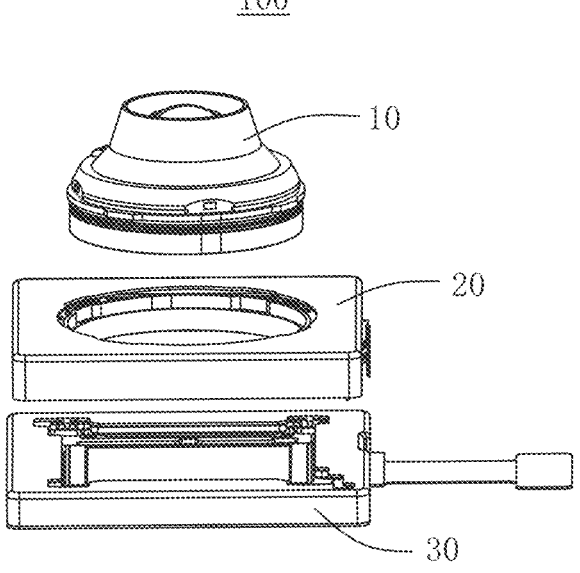
FIG. 4 shows an exploded view of the camera device of the present application.

In this embodiment, as shown in FIGS. 1 and 4, the lens module 10, the focusing drive module 20, and the anti-shake drive module 30 are three mutually independent modules, so each module is assembled separately and then the three modules are assembled together during assembly, which is easier to assemble, and can improve the product yield rate. moreover, the focusing drive module 20 can drive the lens barrel 21 to move in the direction of the optical axis within the first bracket 22 along the lens module 10 to achieve focusing. Besides, the focusing drive module 20 can drive the lens barrel 21 to move along the direction of the optical axis of the lens module 10 within the first bracket 22 in order to achieve a focusing effect, and the anti-shake drive module 30 can drive the image sensor 31 to move relative to the lens module 10 along the direction of the optical axis or along the direction perpendicular to the optical axis to achieve an anti-shake effect, which can effectively guarantee the camera quality. Moreover, the second circuit board 34 is planar, which can effectively reduce the thickness of the anti-shake drive module 30 and the thickness of the camera device 100.

In some embodiments, the first circuit board 25 may be a Flexible Printed Circuit (FPC), which is easier to assemble.

In some embodiments, the second circuit board 34 may be an FPC, which is easier to assemble.

Figures 12, 13:
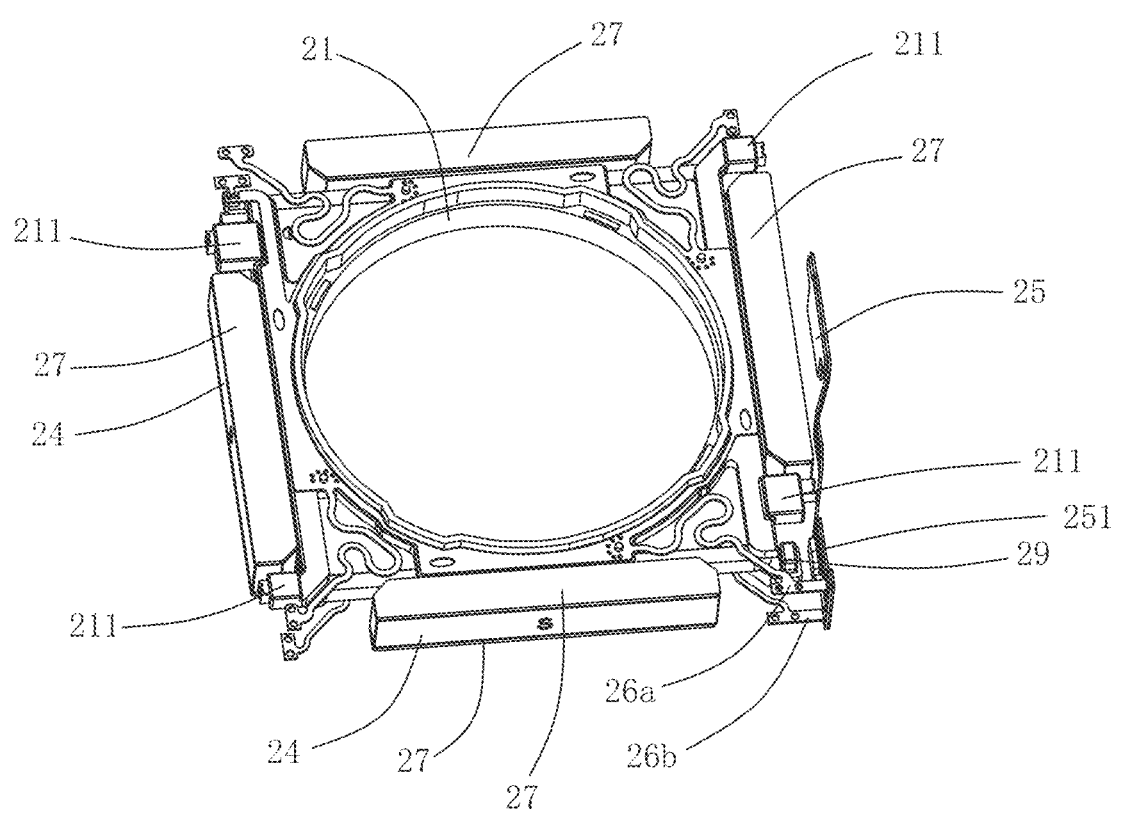
FIG. 12 shows a three-dimensional view of the camera device of the present application with a second housing and the first bracket of the focusing drive module removed.
FIG. 13 shows a three-dimensional view of the anti-shake drive module in the camera device of the present application.
Figure 14:
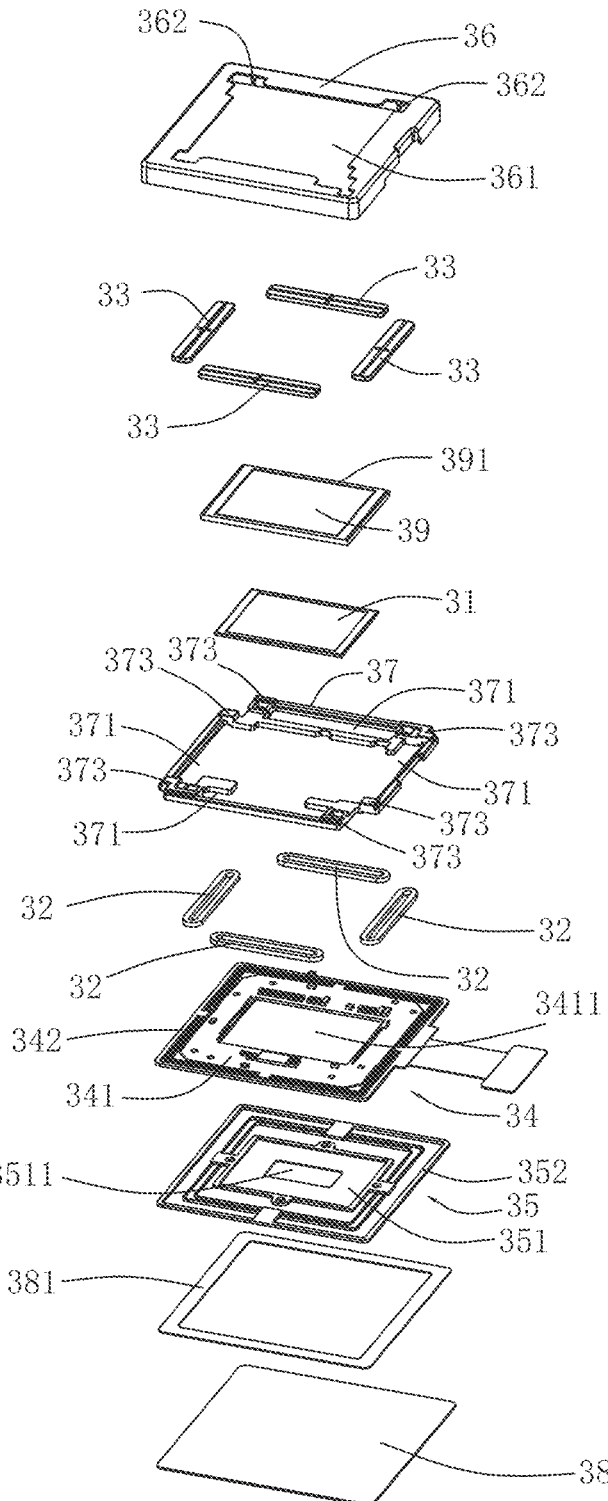
FIG. 14 shows an exploded view of the anti-shake drive module in the camera device of the present application.
Figure 15:
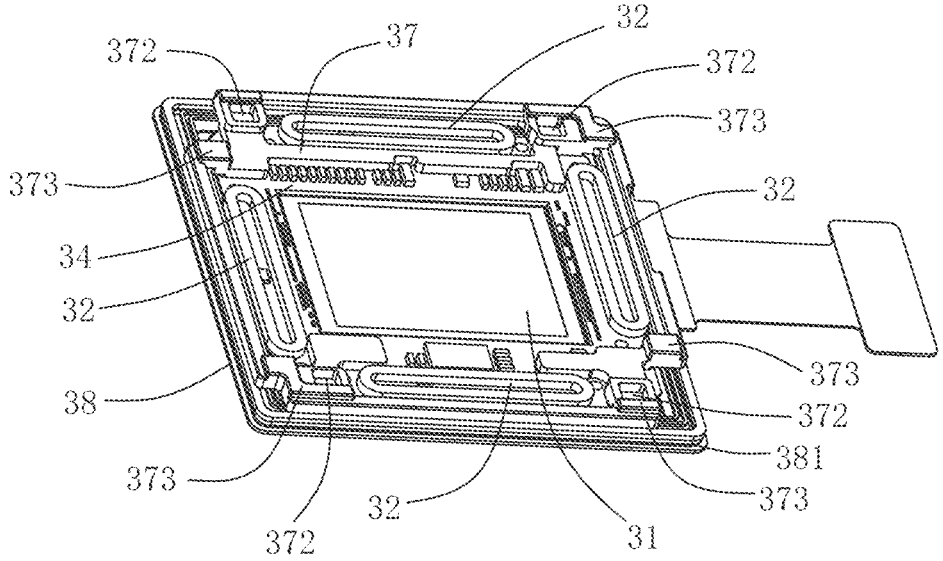
FIG. 15 shows a three-dimensional view of the camera device of the present application with the first housing, the anti-shake magnetic steel, a filter, and a filter support frame removed.

In some embodiments, as shown in FIGS. 13 to 15, the anti-shake drive module 30 further includes a spring plate 35 and a first housing 36. The first housing 36 is configured to accommodate the image sensor 31, the anti-shake coil 32, the anti-shake magnetic steel 33, the second circuit board 34, and the spring plate 35. The spring plate 35 is configured to support and fix the image sensor 31, and the spring plate 35 includes a spring plate body 351 and a spring plate fixing portion 352. The spring plate fixing portion 352 is elastically connected to the outside of the spring plate body 351. The second circuit board 34 includes a circuit board body 341 and a circuit board fixing portion 342. The circuit board fixing portion 342 is elastically connected to the outside of the circuit board body 341, and both the circuit board fixing portion 342 and the spring plate fixing portion 352 are fixed to the first housing 36. The circuit board body 341 is provided with a sunken through-hole 3411, and the sunken through-hole 3411 is cooperated with the image sensor 31. The image sensor 31 is connected to the sunken through-hole 3411 and attached to the spring plate body 351, the anti-shake coil 32 is fixed to the circuit board body 341, and the anti-shake magnet steel 33 is fixed to the first housing 36.

In this embodiment, the image sensor 31 is rear-mounted and affixed to the spring plate body 351. In order to facilitate the rear-mounting of the image sensor 31, the circuit board body 341 is provided with a sinking through-hole 3411 so as to construct the circuit board body 341 as a hollow shape, which is able to effectively sink the image sensor 31 as much as possible. In one embodiment, a countersunk surface 3511 is formed on the spring plate body 351, and the countersunk surface 3511 of the spring plate body 351 is lower than the surface of the spring plate body 351. The countersunk surface 3511 is formed by performing a half-etching treatment on the surface of the spring plate body 351, and the image sensor 31 is affixed to the countersunk surface 3511 of the spring plate body 351.

In this embodiment, the anti-shake drive module 30 adopts a structure combining the flat second circuit board 34 and the spring plate 35, which not only effectively reduces the thickness of the anti-shake drive module 30, but also effectively supports the image sensor 31, with a small volume and a stable structure.

In some embodiments, as shown in FIGS. 13 to 15, the anti-shake drive module 30 further includes a second bracket 37. The second bracket 37 is accommodated in the first housing 36. One end of the second bracket 37 along the direction of the optical axis is fixed to the circuit board body 341, and the other end of the second bracket 37 along the direction of the optical axis is provided with a gap between the second bracket 37 and the first housing 36. The second bracket 37 is provided with a first limit groove 371, and the first limit groove 371 is configured to avoid and accommodate the anti-shake coil 32.

In some embodiments, as shown in FIGS. 13 to 15, the first housing 36 is provided with a mounting hole 361, and the mounting hole 361 is suitable for the image sensor 31 to pass through. A plurality of bending portions 362 are symmetrically formed around the periphery of the mounting hole 361. Each of the bending portions 362 is bent toward the second bracket 37, and a number of docking grooves 372 are provided on the second bracket 37. The docking grooves 372 correspondingly fit with the bending portions 362, and the docking grooves 372 and the bending portions 362 fit one-to-one. The docking grooves 372 are filled with a first damping adhesive, and the first damping adhesive at least partially wraps the bending portions 362 to provide damping for the bending portions 362, thereby providing a buffer effect for the relative displacements between the first housing 36 and the second bracket 37. In some embodiments, in order to make the anti-shake drive module 30 structure more stable, four bending portions 362 are formed around the peripheral edge of the mounting holes 361, and accordingly, four docking grooves 372 are provided on the second bracket 37.

In some embodiments, as shown in FIGS. 14 and 15, an anti-collision tab 373 is formed on a surface of the second bracket 37 facing the first housing 36, so that when the second bracket 37 is moved under the action of the anti-shake coil 32 to collide with the first housing 36, only the anti-collision tab 373 collides with the first housing 36. In some embodiments, as shown in FIGS. 14 and 15, the anti-collision tabs 373 are plurality and distributed at the corners of the second bracket 37, which have the function of anti-collision and stopping rotation.

In some embodiments, as shown in FIGS. 14 and 15, the anti-shake drive module 30 further includes a cover body 38 that cooperates with the first housing 36, and the cover body 38 and the first housing 36 are fixedly connected. The cover body 38 is configured to limit the image sensor 31, the anti-shake coil 32, the anti-shake magnet steel 33, the second bracket 37, the second circuit board 34, and the spring plate 35 within the first housing 36.

In some embodiments, to avoid the cover body 38 from interfering with the movement of the spring plate body 351, as shown in FIG. 14, the anti-shake drive module 30 further includes a gasket 381, which is also accommodated within the first housing 36. The gasket 381 is fixed to the cover body 38 and the spring plate fixing portion 352.

In some embodiments, as shown in FIGS. 13 and 14, the anti-shake drive module 30 further includes a fixedly connected filter 39 and a filter support frame 391. The filter support frame 391 is also fixed to the circuit board body 341.

In some embodiments, as shown in FIGS. 3, 5, 7, 8, 11, and 12, the focusing coil 23 is wrapped around the outside of the lens barrel 21, and the focusing magnetic steel 24 is fixed within the first bracket 22. The focusing drive module 20 further includes an elastic piece 26a and an elastic piece 26b, in which the elastic piece 26a and the elastic piece 26b are supported on two ends of the lens barrel 21 along the direction of the optical axis, respectively. The elastic piece 26a includes an elastic piece body 261, a first connecting portion 262, a second connecting portion 263, and a third connecting portion 264. The elastic piece body 261 is connected to the lens barrel 21. The first connecting portion 262, the second connecting portion 263, and the third connecting portion 264 are respectively bent outwardly from the elastic piece body 261. The first connecting portion 262 is connected to both ends of the first bracket 22 along the direction of the optical axis. The second connecting portion 263 is connected to the coil. The third connecting portion 264 is connected to the first circuit board 25. The elastic piece 26b includes an elastic piece body 261, a first connecting portion 262, a second connecting portion 263, and a third connecting portion 264. The elastic piece body 261 is connected to the lens barrel 21. The first connecting portion 262, the second connecting portion 263, and the third connecting portion 264 are respectively bent outwardly from the elastic piece body 261. The first connecting portion 262 is connected to both ends of the first bracket 22 along the direction of the optical axis. The second connecting portion 263 is connected to the focusing coil 23. The third connecting portion 264 is connected to the first circuit board 25. The elastic piece 26a, the focusing coil 23, the elastic piece 26b, and the first circuit board 25 are electrically connected to form a circuit loop to realize Autofocus (AF) closed-loop control. In some embodiments, to enable more stable movement of the lens barrel 21, the elastic piece 26a includes three first connecting portions 262, and the third connecting portion 264 is connected to the first circuit boards 25 and the first bracket 22. In order to facilitate a connection between the elastic piece 26a and the first bracket 22, and a connection between the elastic piece 26b and the first bracket 22, a plurality of first positioning posts 222 are formed on the first bracket 22, and first positioning holes 265 are formed on the first connecting portions 262 and the third connecting portions 264 that are one-to-one inserted and cooperated with the first positioning posts 222. The first positioning holes 265 are arranged separately on the first connecting portion 262 and the third connecting portion 264. Similarly, a plurality of second positioning posts 212 are formed on the lens barrel 21, and second positioning holes 266 are formed on the elastic piece body 261 that are one-to-one inserted and cooperated with the second positioning posts 212.

In some embodiments, as shown in FIGS. 3, 5, 7, 8, 11, and 12, the focusing drive module 20 further includes a plurality of groups of magnetic guide sheets 27. One group of the magnetic guide sheets 27 is provided corresponding to one focusing magnetic steel 24, and each group of the magnetic guide sheets 27 includes two magnetic guide sheets 27. The two magnetic guide sheets 27 are located at the opposite ends of the corresponding focusing magnetic steels 24 along the direction of the optical axis, respectively, thereby preventing the magnetic line of force of the focusing magnetic steel 24 from leaking out, thereby improving the driving performance of the focusing magnetic steel 24.

In some embodiments, as shown in FIGS. 1 to 5, the focusing drive module 20 further includes a second housing 28, which is configured to accommodate the lens barrel 21, the first bracket 22, the focusing coil 23, the focusing magnetic steels 24, and the first circuit board 25. At least one second limit groove 221 is provided at one end of the first bracket 22 in the direction of the optical axis. Each of the second limit grooves 221 is arranged facing the second housing 28 and filled with a second damping adhesive. The lens barrel 21 is provided with at least one limit portion 211 extending outwardly from the lens barrel 21, which corresponds to the second limit grooves 221 one by one. Each limit portion 211 is limited between the second housing 28 and the corresponding second limit groove 221, and the second damping adhesive can provide damping for the limit portions 211, thereby providing a buffer effect for the relative displacement between the lens barrel 21 and the first bracket 22.

Figure 7:
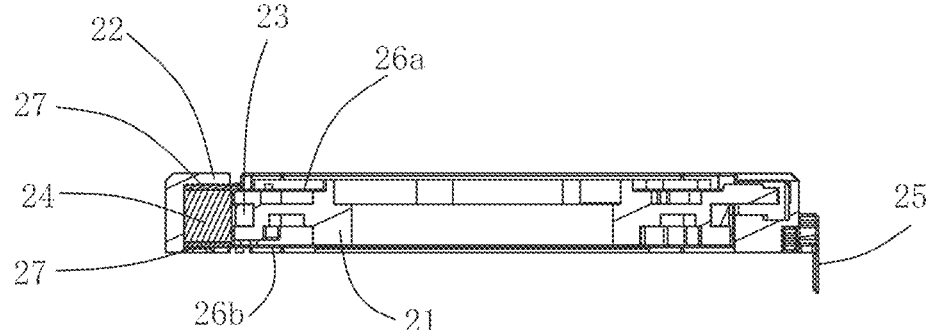
FIG. 7 is a sectional structural view of the camera device in FIG. 6 along the line B-B.
Figure 8:
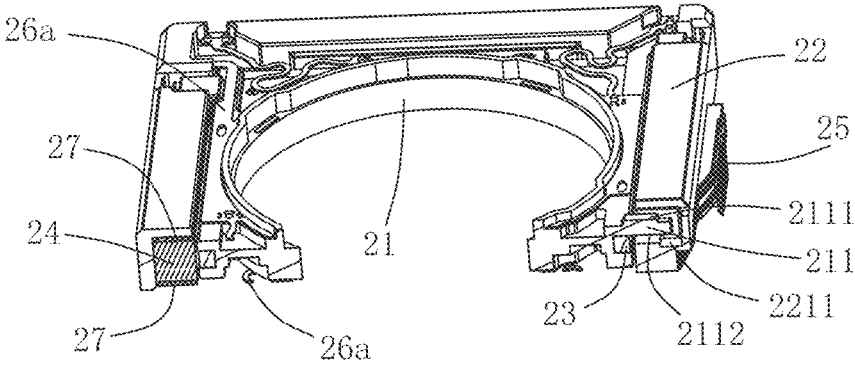
FIG. 8 shows a three-dimensional view of the camera device in FIG. 7.
Figure 9:
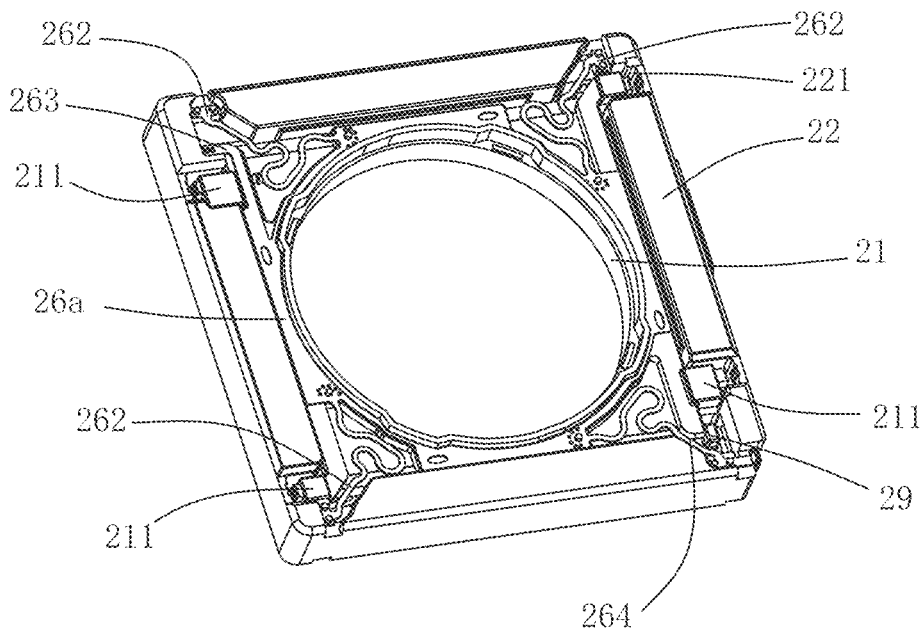
FIG. 9 shows a three-dimensional view of the camera device of the present application with the second housing of the focusing drive module removed.
Figure 10:
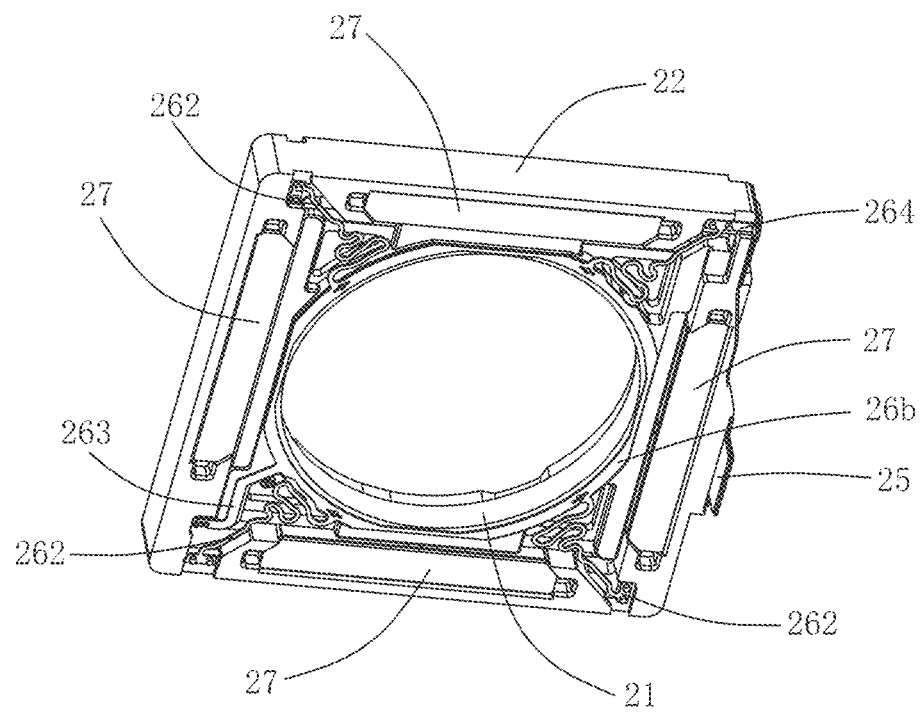
FIG. 10 is a three-dimensional view of the camera device of the present application with the second housing of the focusing drive module removed.
Figure 11:
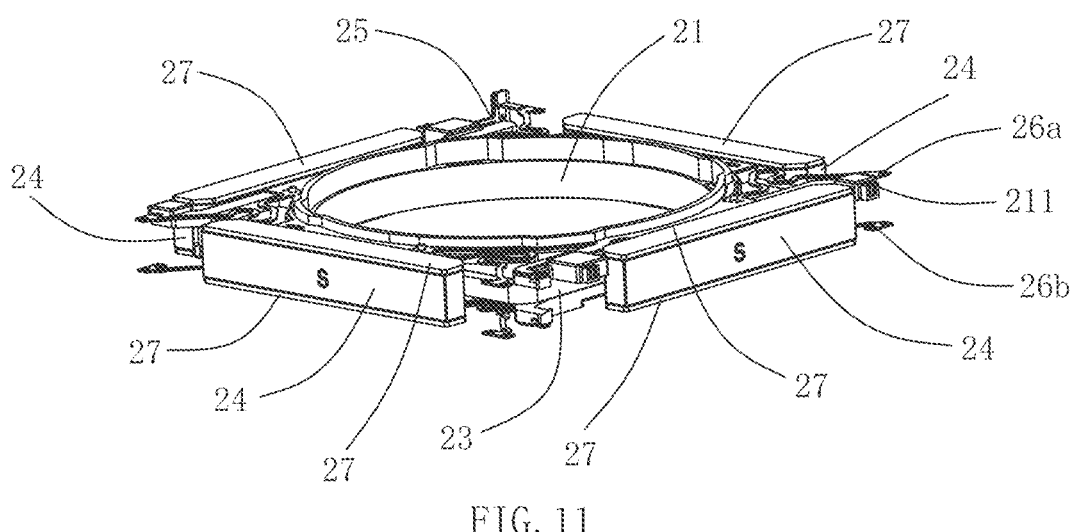
FIG. 11 shows a three-dimensional view of the camera device of the present application with a second housing and the first bracket of the focusing drive module removed.

In some embodiments, as shown in FIGS. 7 and 8, an end face of each limit portion 211 along the direction of the optical axis is constructed as an anti-collision surface 2111 that cooperates with the second housing 28, and an end face of each limit portion 211 along the direction of the optical axis is constructed as an anti-collision surface 2112 that cooperates with the first bracket 22. Specifically, the anti-collision surface 2112 cooperates with the bottom surface 2211 of the second limit groove 221.

Figure 5:
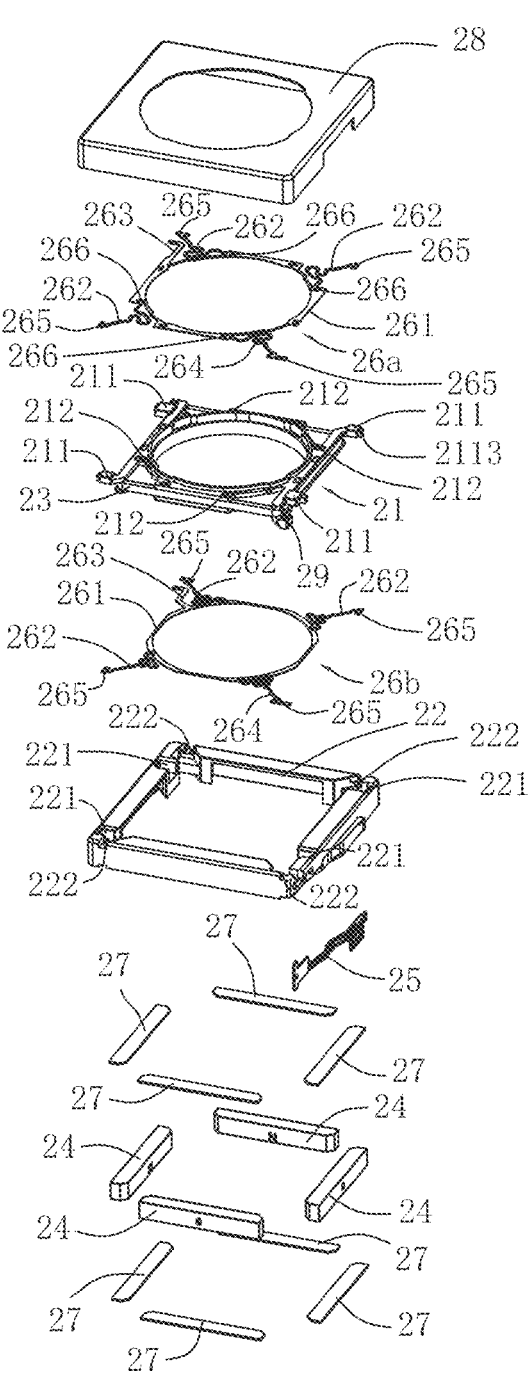
FIG. 5 shows an exploded view of a focusing drive module in the camera device of the present application.
Figure 6:
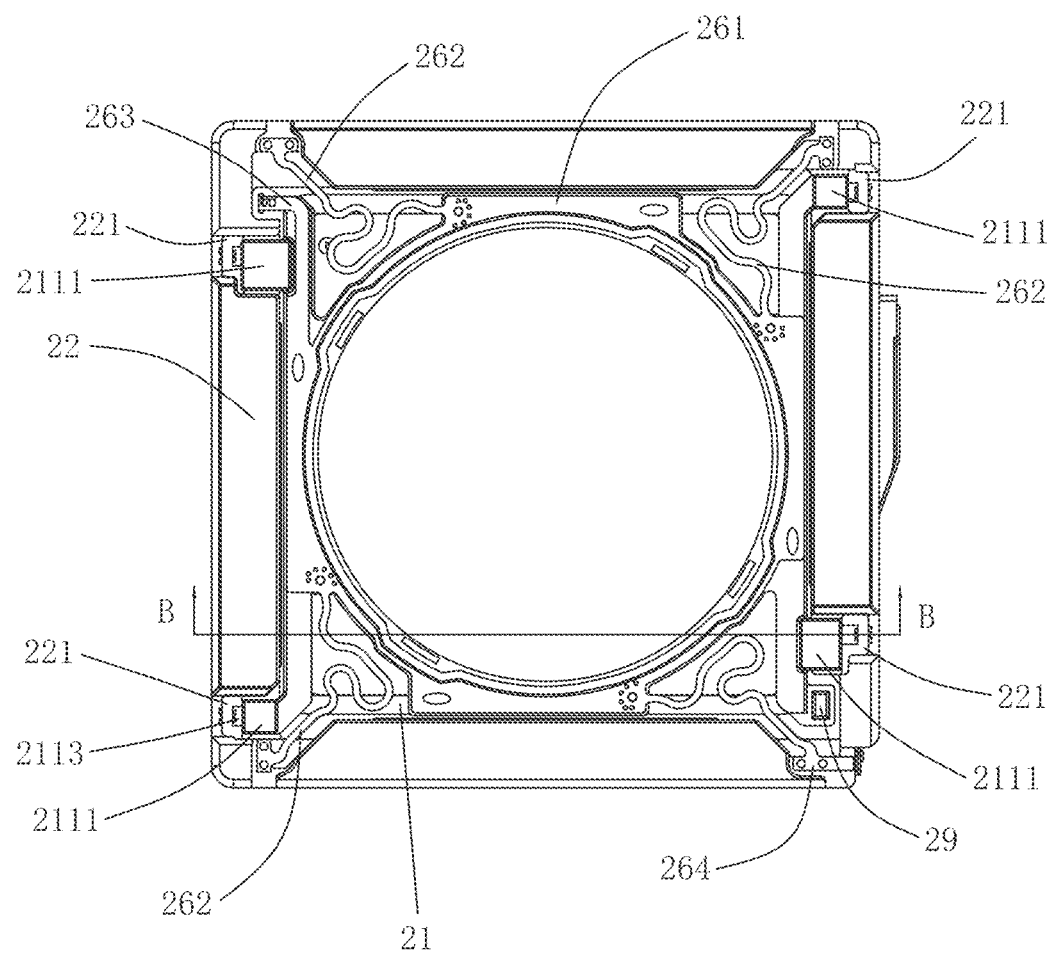
FIG. 6 shows a top view of the camera device of the present application with a second housing of the focusing drive module removed.

In some embodiments, as shown in FIGS. 5, 7, and 8, a step structure 2113 is provided on each of the limiting portions 211, and the step structure 2113 is configured to avoid the second damping adhesive, to prevent the second damping adhesive from being affected upon impact.

In some embodiments, the first circuit board 25 is electrically connected to the second circuit board 34, that is, the elastic piece 26a, the focusing coil 23 and the elastic piece 26b are also electrically connected to the second circuit board 34 through the first circuit board 25.

In some embodiments, as shown in FIG. 12, the focusing drive module 20 further includes a driver chip 251 and a chip magnetic steel 29. The driver chip 251 cooperates with the chip magnetic steel 29 to detect the position of the lens barrel 21. The driver chip 251 is electrically connected to the first circuit board 25, and the chip magnetic steel 29 is fixed to the lens barrel 21 and is arranged relative to the driver chip 251, so that the driver chip 251 can obtain changes in the position of the chip magnetic steel 29 while controlling the current of the focusing coil 23. In some embodiments, the model number of the driver chip 251 may be AK7316.

Embodiments of the present application further provide an electronic device including a device body and a camera device 100 of any one of the above-described types. The camera device 100 is arranged on the device body.

Described above are only some embodiments of the present application. It should be pointed out that for the ordinary skilled person in the field, under the premise of not departing from the creative concept of the present application, improvements may also be made, but these are within the scope of protection of the present application.

What is claimed is:

1. A camera device, comprising:
a lens module;
a focusing drive module, comprising:
a lens barrel fixed to the lens module;
a first bracket configured to accommodate the lens barrel;
a focusing coil and a focusing magnetic steel that are arranged correspondingly; and
a first circuit board, the first circuit board being electrically connected to the focusing coil to enable an interaction between the focusing coil and the focusing magnetic steel to drive the lens barrel to move along a direction of an optical axis of the lens module; and
an anti-shake drive module, wherein the lens module, the focusing drive module, and the anti-shake drive module are sequentially fixed into a one-piece, and the anti-shake drive module comprises:
an image sensor;
an anti-shake coil and an anti-shake magnetic steel that are arranged correspondingly; and
a planar second circuit board; wherein the second circuit board is electrically connected to the focusing coil to enable an interaction between the anti-shake coil and anti-shake magnetic steel to drive the image sensor relative to the lens module to move along a direction around the optical axis or along a direction perpendicular to the optical axis;
wherein the first circuit board is electrically connected to the second circuit board; the focusing drive module further comprises a driver chip and a chip magnetic steel that are cooperated with each other to detect a position of the lens barrel; the driver chip is electrically connected to the first circuit board, and the chip magnetic steel is fixed to the lens barrel and arranged opposite to the driver chip.

2. The camera device of claim 1, wherein the anti-shake drive module further comprises a spring plate, and a first housing configured to accommodate the image sensor, the anti-shake coil, the anti-shake magnetic steel, the second circuit board, and the spring plate; the spring plate comprises a spring plate body and a spring plate fixing portion elastically connected to the spring plate body;
the second circuit board comprises a circuit board body and a circuit board fixing portion elastically connected to an outside of the circuit board body, and the circuit board body and the circuit board fixing portion are both elastically connected to the first housing; the circuit board body is provided with a sunken through-hole for cooperating with the image sensor; the image sensor is connected to an inside of the sunken through-hole and abutted against the spring plate body, and the anti-shake coil and anti-shake magnetic steel are fixed to the circuit board body and the first housing, respectively.

3. The camera device of claim 2, wherein a countersunk surface lower than a surface of the spring plate body is formed on the spring plate body; the countersunk surface is formed by performing a semi-etching treatment on the surface of the spring plate body, and the image sensor is affixed to the countersunk surface of the spring plate body.

4. The camera device of claim 2, wherein the anti-shake drive module further comprises a second bracket accommodated in the first housing; one end of the second bracket is fixed to the circuit board body along the direction of the optical axis, and a gap is provided between the other end of the second bracket and the first housing; and the second bracket is provided with a first limit groove configured to accommodate the anti-shake coil.

5. The camera device of claim 4, wherein the first housing is provided with a mounting hole suitable for the image sensor to pass through; the mounting hole is provided with a plurality of bending portions symmetrically formed around a peripheral edge of the mounting hole and bending toward the second bracket;
the second bracket is provided with docking grooves correspondingly cooperating with the bending portions, and the docking grooves are filled with a first damping adhesive at least partially wrapping the bending portions.

6. The camera device of claim 4, wherein an anti-collision tab is formed on a surface of the second bracket facing the first housing.

7. The camera device of claim 1, wherein the focusing coil is wound outside the lens barrel, and the focusing magnetic steel is fixed in the first bracket; the focusing drive module further comprises two elastic pieces supported at two ends of the lens barrel in the direction of the optical axis, respectively; each of the elastic pieces comprising an elastic piece body connected to the lens barrel, a first connecting portion, a second connecting portion, and a third connecting portions that are bending and extending outwardly from the elastic piece body; the first connecting portions of the two elastic pieces are connected to two ends of the first bracket in the direction of the optical axis, respectively, and the second connecting portions and the third connecting portions of the two elastic pieces are connected to the focusing coil and the first circuit board, respectively, to form a circuit.

8. The camera device of claim 1, wherein the focusing drive module further comprises a second housing configured to accommodate the lens barrel, the first bracket, the focusing coil, the focusing magnetic steel, and the first circuit board;
one end of the first bracket along the direction of the optical axis is provided with a second limit groove facing the second housing, and the second limit groove is filled with a second damping adhesive; the lens barrel is provided with a limit portion extending outwardly from the lens barrel; the limit portions cooperate with the second limit grooves one by one and are limited between the second housing and the corresponding second limit groove; each of the limit portions is provided with a step structure for avoiding the second damping adhesive, and end surfaces of both ends of each of the limit portion along the direction of the optical axis are constructed as anti-collision surfaces.

9. An electronic device, comprising a device body and a camera device of claim 1, wherein the camera device is provided on the device body; wherein the first circuit board is electrically connected to the second circuit board; the focusing drive module further comprises a driver chip and a chip magnetic steel that are cooperated with each other to detect a position of the lens barrel; the driver chip is electrically connected to the first circuit board, and the chip magnetic steel is fixed to the lens barrel and arranged opposite to the driver chip.

10. The electronic device of claim 9, wherein the anti-shake drive module further comprises a spring plate, and a first housing configured to accommodate the image sensor, the anti-shake coil, the anti-shake magnetic steel, the second circuit board, and the spring plate; the spring plate comprises a spring plate body and a spring plate fixing portion elastically connected to the spring plate body;

the second circuit board comprises a circuit board body and a circuit board fixing portion elastically connected to an outside of the circuit board body, and the circuit board body and the circuit board fixing portion are both elastically connected to the first housing; the circuit board body is provided with a sunken through-hole for cooperating with the image sensor; the image sensor is connected to an inside of the sunken through-hole and abutted against the spring plate body, and the anti-shake coil and anti-shake magnetic steel are fixed to the circuit board body and the first housing, respectively.

11. The electronic device of claim 10, wherein a countersunk surface lower than a surface of the spring plate body is formed on the spring plate body; the countersunk surface is formed by performing a semi-etching treatment on the surface of the spring plate body, and the image sensor is affixed to the countersunk surface of the spring plate body.

12. The electronic device of claim 10, wherein the anti-shake drive module further comprises a second bracket accommodated in the first housing; one end of the second bracket is fixed to the circuit board body along the direction of the optical axis, and a gap is provided between the other end of the second bracket and the first housing; and the second bracket is provided with a first limit groove configured to accommodate the anti-shake coil.

13. The electronic device of claim 12, wherein the first housing is provided with a mounting hole suitable for the image sensor to pass through; the mounting hole is provided with a plurality of bending portions symmetrically formed around a peripheral edge of the mounting hole and bending toward the second bracket;

the second bracket is provided with docking grooves correspondingly cooperating with the bending portions, and the docking grooves are filled with a first damping adhesive at least partially wrapping the bending portions.

14. The electronic device of claim 12, wherein an anti-collision tab is formed on a surface of the second bracket facing the first housing.

15. The electronic device of claim 9, wherein the focusing coil is wound outside the lens barrel, and the focusing magnetic steel is fixed in the first bracket; the focusing drive module further comprises two elastic pieces supported at two ends of the lens barrel in the direction of the optical axis, respectively; each of the elastic pieces comprising an elastic piece body connected to the lens barrel, a first connecting portion, a second connecting portion, and a third connecting portions that are bending and extending outwardly from the elastic piece body; the first connecting portions of the two elastic pieces are connected to two ends of the first bracket in the direction of the optical axis, respectively, and the second connecting portions and the third connecting portions of the two elastic pieces are connected to the focusing coil and the first circuit board, respectively, to form a circuit.

16. The electronic device of claim 9, wherein the focusing drive module further comprises a second housing configured to accommodate the lens barrel, the first bracket, the focusing coil, the focusing magnetic steel, and the first circuit board; one end of the first bracket along the direction of the optical axis is provided with a second limit groove facing the second housing, and the second limit groove is filled with a second damping adhesive; the lens barrel is provided with a limit portion extending outwardly from the lens barrel; the limit portions cooperate with the second limit grooves one by one and are limited between the second housing and the corresponding second limit groove; each of the limit portions is provided with a step structure for avoiding the second damping adhesive, and end surfaces of both ends of each of the limit portion along the direction of the optical axis are constructed as anti-collision surfaces.

\* \* \* \* \*